United States Patent
Chen et al.

(10) Patent No.: US 10,602,362 B2
(45) Date of Patent: Mar. 24, 2020

(54) GATEWAY, GATEWAY SETUP METHOD, AND IOT DEVICE SETUP METHOD IN IOT SYSTEM

(71) Applicants: LITE-ON ELECTRONICS (GUANGZHOU) LIMITED, Guangzhou (CN); Lite-On Technology Corporation, Taipei (TW)

(72) Inventors: Hung-Chih Chen, Taipei (TW); Tzu-Hao Tsao, Taipei (TW); Kai-Ho Hsiung, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 70 days.

(21) Appl. No.: 15/688,883

(22) Filed: Aug. 29, 2017

(65) Prior Publication Data

US 2018/0184298 A1    Jun. 28, 2018

Related U.S. Application Data

(60) Provisional application No. 62/439,155, filed on Dec. 27, 2016.

(30) Foreign Application Priority Data

May 11, 2017    (CN) .......................... 2017 1 0329371

(51) Int. Cl.
*H04W 12/08* (2009.01)
*H04W 12/02* (2009.01)
(Continued)

(52) U.S. Cl.
CPC .......... *H04W 12/08* (2013.01); *H04B 17/318* (2015.01); *H04L 63/083* (2013.01);
(Continued)

(58) Field of Classification Search
CPC ..... H04W 12/08; H04W 76/10; H04W 12/06; H04W 12/02; H04W 88/16; H04L 63/083; H04B 17/318
See application file for complete search history.

(56) References Cited

U.S. PATENT DOCUMENTS

| | | |
|---|---|---|
| 2010/0122091 A1 | 5/2010 | Huang et al. |
| 2014/0244768 A1* | 8/2014 | Shuman .................. H04W 4/70 709/206 |

(Continued)

OTHER PUBLICATIONS

"Office Action of Taiwan Counterpart Application", dated May 9, 2018, p. 1-p. 8.

*Primary Examiner* — Meng Li
(74) *Attorney, Agent, or Firm* — JCIPRNET

(57) ABSTRACT

A gateway, a gateway setup method, and an IoT device setup method are provided. The gateway setup method includes to detect received signal strength indicator (RSSI) between a user device and a gateway to determine whether a distance between the two devices is less than a distance threshold. If yes, authentication information is exchanged between the gateway and the user device so that the gateway is able to connect to the server through an access point and the user device is able to connect to the server and the gateway. The IoT device setup method includes to detect RSSI between an IoT device and the gateway device to determine whether a distance between the two devices is less than a distance threshold. If yes, authentication information is exchanged between the gateway and the IoT device so that the two devices are able to connect to each other.

12 Claims, 3 Drawing Sheets

(51) Int. Cl.
*H04B 17/318* (2015.01)
*H04W 12/06* (2009.01)
*H04W 76/10* (2018.01)
*H04L 29/06* (2006.01)
*H04W 88/16* (2009.01)

(52) U.S. Cl.
CPC ........... *H04W 12/02* (2013.01); *H04W 12/06* (2013.01); *H04W 76/10* (2018.02); *H04W 88/16* (2013.01)

(56) References Cited

U.S. PATENT DOCUMENTS

| | | | |
|---|---|---|---|
| 2015/0172118 A1* | 6/2015 | Lin | H04L 41/0806 370/401 |
| 2016/0156673 A1* | 6/2016 | Emmanuel | H04W 16/14 370/338 |
| 2017/0353859 A1* | 12/2017 | Idnani | H04W 12/08 |

* cited by examiner

GATEWAY, GATEWAY SETUP METHOD, AND IOT DEVICE SETUP METHOD IN IOT SYSTEM

CROSS REFERENCE TO RELATED APPLICATION

This application claims the priority benefit of U.S. provisional application Ser. No. 62/439,155, filed on Dec. 27, 2016 and China application serial no. 201710329371.8, filed on May 11, 2017. The entirety of each of the above-mentioned patent applications is hereby incorporated by reference herein and made a part of this specification.

TECHNICAL FIELD

The disclosure relates to Internet-of-Things (IoT) technology, in particular to, a gateway, a gateway setup method, and an IoT device set up method in an IoT system.

BACKGROUND

Technological advancements to smart technology in each country have now revolutionized the application of IoT and the development of smart home environment. Although the concept of smart home has been extensively introduced by the media, the market penetration rate of related products is still below 5.8% due to cumbersome setup processes and manual input that are not consumer friendly.

SUMMARY OF THE DISCLOSURE

Accordingly, a gateway, a gateway setup method, and a IoT device setup method are provided in the disclosure, where a gateway setup process and a IoT device setup process would be simplified with no additional hardware cost and complicated mechanical design involved so as to reduce steps of manual input and authorization and thereby provide an asset to competitive advantages of related products in the market.

According to one of the exemplary embodiments, the gateway setup method is applicable to an IoT system having a gateway, a user device, a server, an access point, and an IoT device, where the user device stores authentication information of the user device and authentication information of the access point, and the gateway stores authentication information of the gateway and authentication information of the server. The method includes the following steps. Received signal strength indicator (RSSI) between the user device and the gateway is detected by the gateway so as to determine whether a first distance between the user device and the gateway is less than a first distance threshold. If yes, the authentication information is exchanged between the gateway and the user device. Next, the gateway connects to the server via the access point by using the authentication information of the access point. The user device connects to the server by using the authentication information of the server and also connects to the gateway by using the authentication information of the gateway to complete a setup of the gateway in the IoT system.

According to one of the exemplary embodiments, the IoT setup method is applicable to an IoT system having a gateway, a user device, a server, an access point, and an IoT device, where the user device connects the server and the gateway, and the gateway connects to the server via the access point. The method includes the following steps. RSSI between the IoT device and the gateway is detected by the gateway so as to determine whether a second distance between the IoT device and the gateway is less than a second distance threshold. If yes, the authentication information is exchanged between the gateway and the IoT device so that the gateway and the IoT device connect to each other to complete a setup of the IoT device in the IoT system.

According to one of the exemplary embodiments, the gateway includes a communication module, a memory, and a processor, where the processor is coupled to the communication module and the memory. The communication module is configured to detect signals between the gateway and other devices and convert detected signals to RSSI and is also configured to connect to other devices. The memory is configured to store authentication information of the gateway and authentication information of the server. The processor is configured to obtain RSSI between the user device and the gateway from the communication module so as to determine whether a first distance between the user device and the gateway is less than a first distance threshold, where the user device stores authentication information of the user device and authentication information of an access point. When the processor determines that the first distance is less than the first distance threshold, the processor is configured to exchange the authentication information with the user device through the communication module so as to connect to the server via the access point by using the authentication information of the access point, where the user device connects to the server by using the authentication information of the server and connects to the gateway by using the authentication information of the gateway. The processor is also configured to obtain RSSI between the IoT device and the gateway from the communication module so as to determine whether a second distance between the IoT device and the gateway is less than a second distance threshold. When the processor determines that the second distance is less than the second distance threshold, the processor exchanges the authentication information with the IoT device through the communication module so as to be connected with the IoT device.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
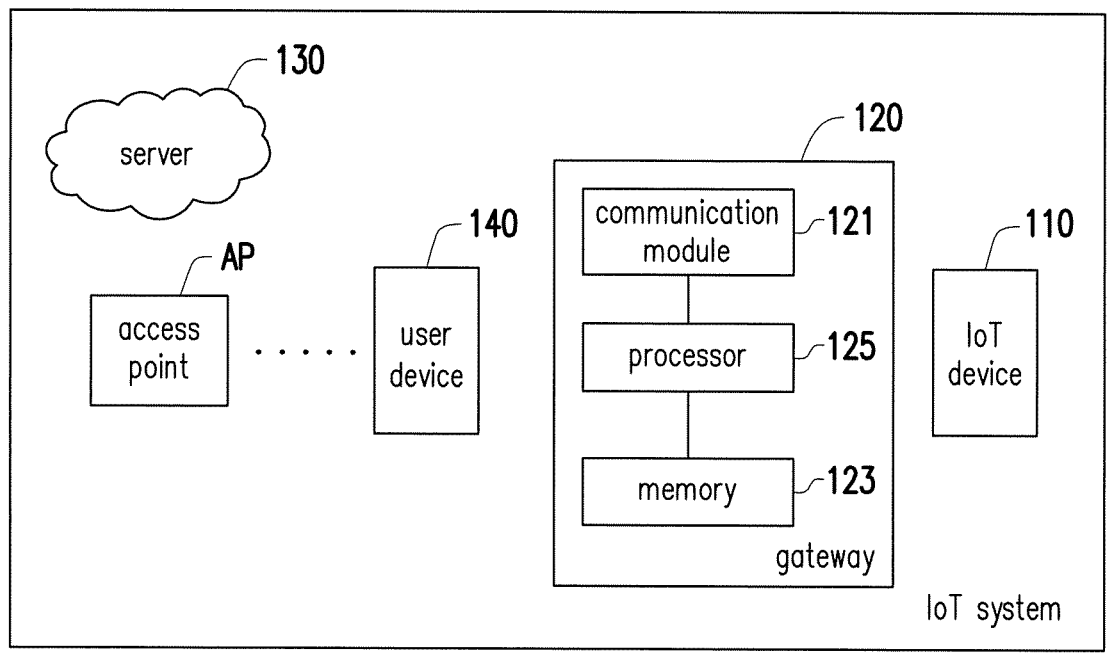
FIG. 1 illustrates a block diagram of an IoT system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of an IoT system in accordance with one of the exemplary embodiments of the disclosure. All components of the IoT system and their configurations prior to installation and setup are first introduced in FIG. 1. The functionalities of the components are disclosed in more detail in conjunction with FIG. 2.

Referring to FIG. 1, an IoT system 100 may include an IoT device 110, a gateway 120, a server 130, a user device 140, and an access point AP. In the following exemplary embodiments, the IoT system 100 may be a smart home IoT system for illustrative purposes, and yet the disclosure is not limited in this regard.

The IoT device 110 may be, for example, power equipment, lighting equipment, surveillance equipment, air conditioning equipment, home appliance equipment, multimedia and entertainment equipment, or any other monitoring equipment with one or more sensors such as a motion sensor, a voice sensor, an image sensor, a temperature sensor, a humidity sensor, a pressure sensor, an air sensor, and an ultraviolet (UV) sensor. The IoT device 110 may include a communication module, a memory, and a controller. After installation setup, the IoT device 110 would be able to transmit data to the gateway 120 and receive a control command from the gateway 120 to accordingly execute a corresponding function. In the present exemplary embodiment, the IoT device 110 would store its own authentication information in the memory.

The gateway 120 may be network equipment and include a communication module 121, a memory 123, and a processor 125. In the present exemplary embodiment, the gateway 120 may be a home gateway. After installation setup, the gateway 120 would be connected with the IoT device 110, the server 130, and the user device 140 so that the user is able to remotely control the IoT device 110 by using the user device 140.

The communication module 121 may include a communication interface with any wireless transmission standard such as Wi-Fi, ZigBee, Bluetooth, and so forth. The communication module 121 may also include a RSSI detector configured to convert wireless signals received by the communication module 121 to RSSI.

The memory 123 may be any form of non-transitory, volatile, and non-volatile memories. The memory 123 would be configured to store buffered data, permanent data, and complied programming code to execute the functions of the gateway 120. In the present exemplary embodiment, the memory 123 would prestore authentication information of the gateway 120 and authentication information of the server 130.

The processor 125 may be one or a combination of a central processing unit (CPU), a programmable general purpose or special purpose microprocessor, a digital signal processor (DSP), an application specific integrated circuit (ASIC), a programmable logic device (PLD), or other similar devices. The processor 125 would be configured to control an overall operation of the gateway 120.

The server 130 may be a computer device with computing capabilities such as a cloud server, a database server, an application server, a workstation, a personal computer, and so forth.

The user device 140 may be a user's mobile communication device such as a smart phone, a tabular computer, a laptop computer, a smart wearable device, and so forth. The user device 140 may connect to a network via Wi-Fi, 3G, or 4G connection. Once the setup of the IoT device 110 and the gateway 120 is complete, the user device 140 would allow the user to remotely control the IoT device 110. In the present exemplary embodiment, the user device 140 would prestore authentication information of its own as well as authentication information of the access point AP.

Figure 2:
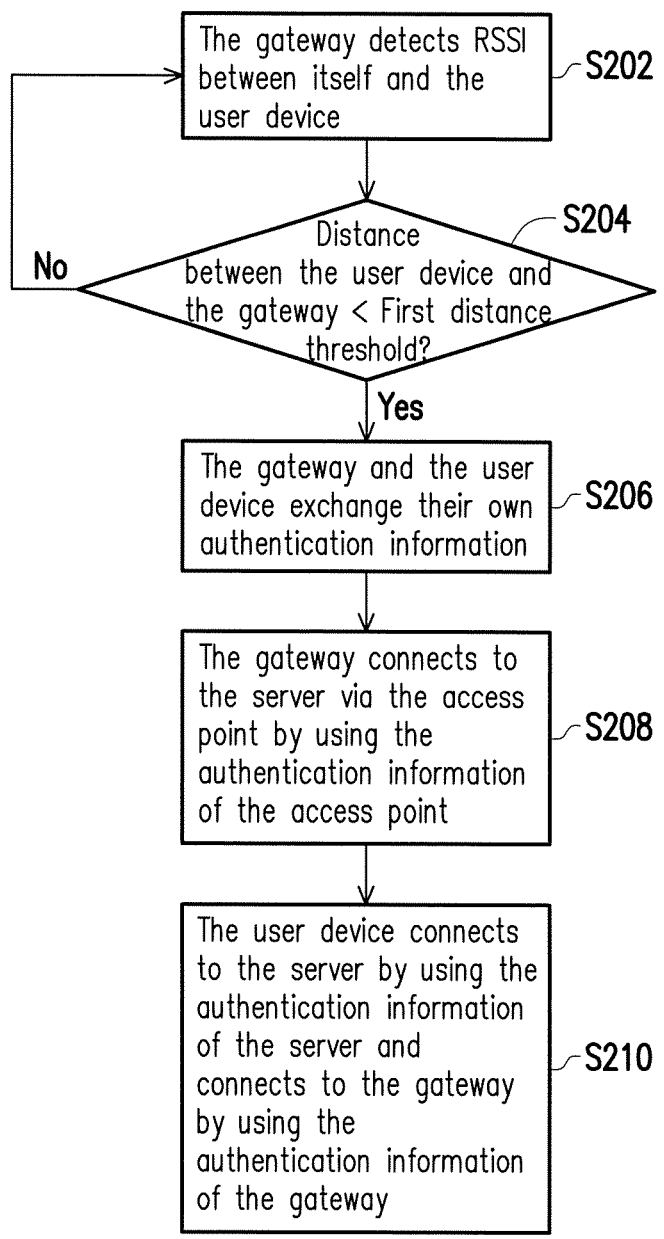
FIG. 2 illustrates a flowchart of a gateway setup method in accordance with one of the exemplary embodiments of the disclosure.

FIG. 2 illustrates a setup method of the gateway 120 in accordance with one of the exemplary embodiments of the disclosure.

Referring to both FIG. 1 and FIG. 2, RSSI detected by the gateway 120 is used to determine whether the user device 140 is within a short distance to confirm the ownership of the two devices. In other words, the user may move the user device 140 close to the gateway 120 or move the gateway 120 close to the user device 140 to initiate the setup of the gateway 120 in the present exemplary embodiment.

Accordingly, the gateway 120 would detect RSSI between itself and the user device 140 (Step S202) so as to determine whether a distance between the two devices is less than a first distance threshold (Step S204). In detail, since the value of the RSSI may reflect a distance between transmitting and receiving devices (i.e. the closer the distance between transmitting and receiving devices is, the greater the detected RSSI is), the processor 125 of the gateway 120 may determine whether the user device 140 is within a short distance according to the RSSI measured by the communication module 121. The first distance threshold may be, for example, an extremely short distance such as 10 cm to avoid other devices being falsely detected as well as to avoid the step of the gateway 120 being initiated by other suspicious devices.

When the gateway 120 determines that the distance between the user device 140 and the gateway 120 is not less than the first distance threshold, the flow would return to Step S202, and the gateway 120 would continuously detect the RSSI between itself and the user device 140.

On the other hand, when the gateway 120 determines that the distance between itself and the user device 140 is less than the first distance threshold, the gateway 120 and the user device 140 would exchange their own authentication information (Step S206) to provide authorization and authentication to each other. Herein, the user device 140 may transmit its own hardware identifier as well as a service set identifier and a password of the access point AP to the gateway 120 through the communication module. Also, the gateway 120 may transmit a software key of the gateway 120 and a software key of the server 130 to the user device 140 through the communication module 121.

Next, the gateway 120 would connect to the server 130 via the access point AP by using the authentication information of the access point AP (Step S208). Moreover, the user device 140 would connect to the server 130 by using the authentication information of the server 130 and connect to the gateway 120 by using the authentication information of the gateway (Step S210). That is, the processor 125 of the gateway 120 may connect to the server 130 through the communication module 121 by using the received server set identifier and the received password of the access point AP. The user device 140 may connect to the server 130 by using the received software key of the server 130 and connect to the gateway 120 by using the received software key of the gateway 120. The setup of the gateway 120 of the IoT system 100 is then complete.

Figure 3:
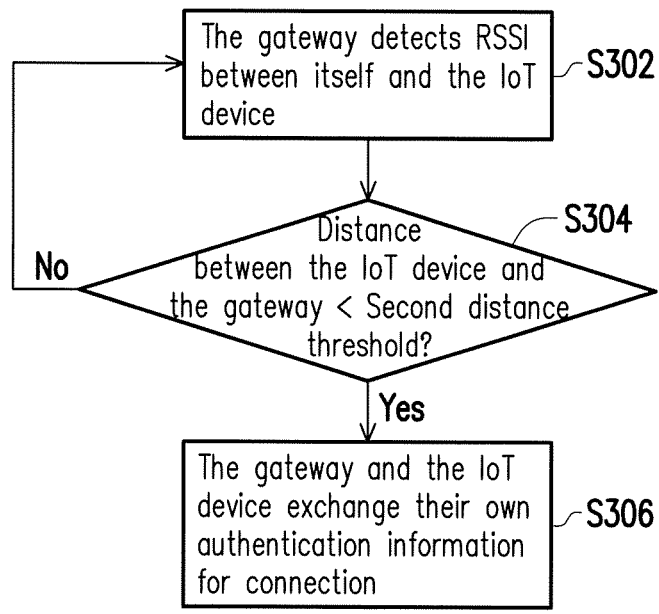
FIG. 3 illustrates a flowchart of an IoT device setup method in accordance with one of the exemplary embodiments of the disclosure.

FIG. 3 illustrates a flowchart of a setup method of the IoT device 110 in accordance with one of the exemplary embodiments of the disclosure. Before entering the flow in FIG. 3, the setup of the gateway 120 is complete according to, for example, the flow in FIG. 2.

Referring to FIG. 1 and FIG. 3, RSSI detected by the gateway 120 is used to determine whether the IoT device 110 is within a short distance to confirm the ownership of the two devices. In other words, the user may move the IoT device 110 close to the gateway 120 or move the gateway 120 close to the IoT device 110 to initiate the setup of the IoT device 110 in the present exemplary embodiment.

Accordingly, the gateway 120 would detect RSSI between itself and the IoT device 110 (Step S302) so as to determine whether a distance between the two devices is less than a second distance threshold (Step S304). Similar to Step S302-S304, the second distance threshold may also be an extremely short distance such as 10 cm to avoid other devices being falsely detected as well as to avoid other suspicious devices being setup in the IoT system 100.

When the gateway 120 determines that the distance between the IoT device 110 and the gateway 120 is not less than the second distance threshold, the flow would return to Step S302, and the gateway 120 would continuously detect the RSSI between itself and the IoT device 110.

On the other hand, when the gateway 120 determines that the distance between itself and the IoT device 110 is less than the second distance threshold, the gateway 120 and the IoT device 110 would exchange their own authentication information so that the gateway 120 and the IoT device 110 would connect to each other (Step S306). That is, the IoT device 110 may transmit its own hardware related information to the gateway 120, where the hardware information may be a hardware identifier, a hardware key, or hardware data. Also, the gateway 120 may transmit the software key of the gateway 120 to the IoT device 110 through the communication module 121. The IoT device 110 and the gateway 120 would connect to each other by using the received authentication information. The setup of the IoT device 110 of the IoT system 100 is then complete.

Figure 4:
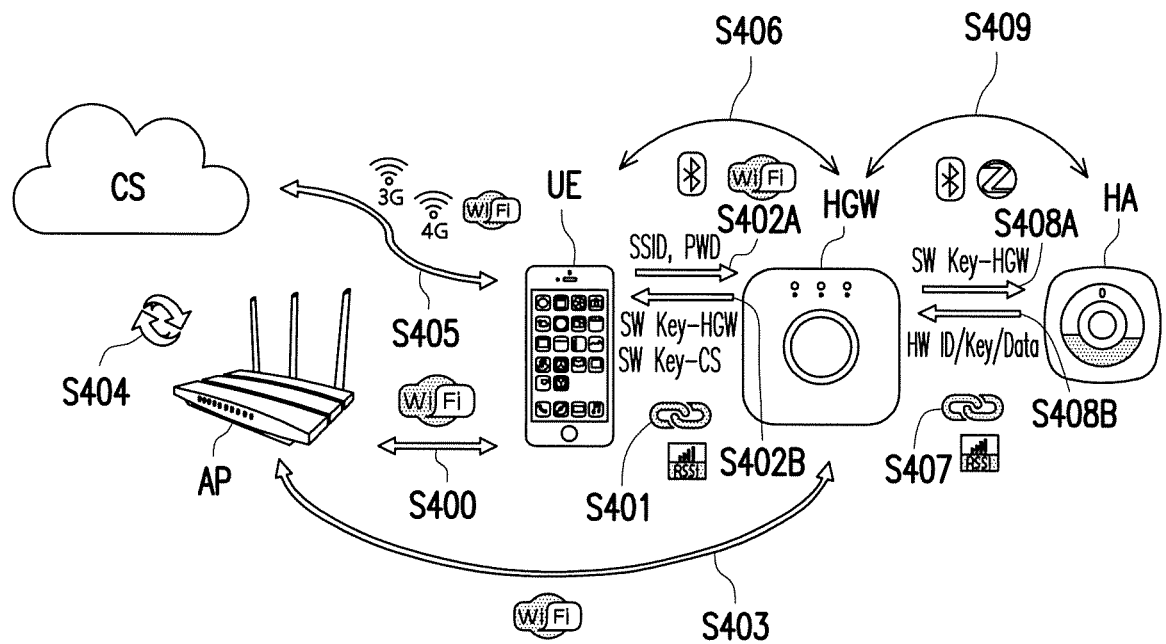
FIG. 4 illustrates a schematic flow diagram of a gateway setup method and an IoT device setup method in accordance with one of the exemplary embodiments of the disclosure.

FIG. 4 illustrates a schematic flow diagram of a setup method of the gateway 120 and a setup method of the IoT device 110 in accordance with one of the exemplary embodiments of the disclosure. In the present exemplary embodiment, a home appliance HA is equivalent to the IoT device 110; a gateway HGW is equivalent to the gateway 120; a cloud server CS is equivalent to the server 130; and a mobile phone UE is equivalent to the user device 140.

Referring to FIG. 4, before the setup of the gateway HGW has been initiated, the mobile phone UE would be able to connect to a Wi-Fi access point AP (Step S400). In terms of the setup of the gateway HGW, when the gateway HGW determines that the mobile phone UE is within a short distance based on detected RSSI (Step S401), the gateway HGW and the mobile phone UE would exchange their own authentication information with each other (Step S402A, Step S402B). Herein, the mobile phone UE would transmit a hardware identifier HWID of its own as well as a service set identifier SSID and a password PWD of the Wi-Fi access point AP to the gateway HGW, and the gateway HGW would transmit a software key Key-HGW of the gateway HGW as well as a software key SW Key-CS of the cloud server CS to the mobile phone UE.

Next, the gateway HGW would connect to the Wi-Fi access point AP by using the service set identifier SSID and the password PWD of the Wi-Fi access point AP (Step S403) so as to further connect to the cloud server CS (Step S404). On the other hand, the mobile phone UE would connect to the cloud server CS via, for example, Wi-Fi, 3G, or 4G connection by using the received software key SW Key-CS of the cloud server CS (Step S405) and connect to the gateway HGW via, for example, Wi-Fi or Bluetooth connection by using the received software key SW Key-HGW of the gateway HGW (Step S406) to complete the setup of the gateway HGW.

In terms of the setup of the home appliance HA, when the gateway HGW determines that the home appliance HA is within a short distance based on detected RSSI (Step S407), the gateway HGW and the home appliance HA would exchange their own authentication information with each other (Step S408A, Step S408B). Herein, the home appliance HA would transmit hardware related information HWID/Key/Data to the gateway HGW, and the gateway HGW would transmit the software key SW Key-HGW of the gateway HGW to the home appliance HA. The gateway HGW and the home appliance HA may thus be able to connect to each other via, for example, Bluetooth or Zigbee connection (Step S409) to complete the setup of the home appliance HA. Details of FIG. 4 may refer to related steps in FIG. 2 and FIG. 3 and would not be repeated herein for brevity purposes.

In summary, the gateway, the gateway setup method, and the IoT device setup method proposed in the disclosure determine whether the user device and the IoT device are within a short distance according to the RSSI between the gateway and the user device as well as the RSSI between the gateway and the IoT device so as to confirm the ownership of the devices and initiate the setup of the devices thereafter. Moreover, during the setup process, the authentication information of the devices may simplify manual input. Hence, the disclosure provides simplification of the gateway setup process and the IoT device setup process with no additional hardware cost and complicated mechanical design involved to reduce steps of manual input and authorization, and thereby provide an asset to competitive advantages of related products in the market.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A gateway setup method, applicable to an Internet-of-Things (IoT) system having a gateway, a user device, a server, and an access point, wherein the user device stores authentication information of the user device and authentication information of the access point, wherein the gateway stores authentication information of the gateway and authentication information of the server, and wherein the method comprises the following steps:
   detecting received signal strength indicator between the user device and the gateway by the gateway so as to determine whether a first distance between the user device and the gateway is less than a first distance threshold;
   in response to the first distance determined to be less than the first distance threshold by the gateway, transmitting the authentication information of the gateway and the authentication information of the server to the user device by the gateway, and transmitting the authentication information of the user device and the authentication information of the access point to the gateway by the user device;
   connecting to the access point by the gateway by using the authentication information of the access point so as to connect to the server; and
   connecting to the server by the user device by using the authentication information of the server and connecting to the gateway by the user device by using the authentication information of the gateway to complete a setup of the gateway of the IoT system.

2. The method according to claim 1, wherein the step of transmitting the authentication information of the gateway and the authentication information of the server to the user device by the gateway, and transmitting the authentication information of the user device and the authentication information of the access point to the gateway by the user device comprises:
   transmitting a hardware identifier of the user device as well as a service set identifier and a password of the access point to the gateway by the user device; and
   transmitting a software key of the gateway and a software key of the server to the user device by the gateway.

3. The method according to claim 2, wherein the step of connecting to the access point by the gateway by using the authentication information of the access point so as to connect to the server comprises:
   connecting to the access point by the gateway by using the received service set identifier and the received password of the access point so as to connect to the server.

4. The method according to claim 2, wherein the step of connecting to the server by the user device by using the authentication information of the server and connecting to the gateway by the user device by using the authentication information of the gateway comprises:
   connecting to the server by the user device by using the received software key of the server; and
   connecting to the gateway by the user device by using the received software key of the gateway.

5. The method according to claim 1, wherein the server is a cloud server.

6. A gateway comprising:
   a communication module, configured to detect signals between the gateway and any other devices and convert detected signals to received signal strength indicator, and configured to connect to the any other devices;
   a memory, configured to store authentication information of the gateway and authentication information of the server; and
   a processor, coupled to the communication module and the memory, and configured to perform the following steps:
      obtaining received signal strength indicator between the user device and the gateway from the communication module so as to determine whether a first distance between the user device and the gateway is less than a first distance threshold, wherein the user device stores authentication information of the user device and authentication information of an access point;
      in response to the first distance determined to be less than the first distance threshold, transmitting the authentication information of the gateway and the authentication information of the server to the user device through the communication module and receiving the authentication information of the user device and the authentication information of the access point from the user device through the communication module so as to connect to the server via the access point by using the authentication information of the access point, wherein the user device connects to the server by using the authentication information of the server and connects to the gateway by using the authentication information of the gateway;
      obtaining received signal strength indicator between an Internet-of-Things (IoT) device and the gateway from the communication module so as to determine whether a second distance between the IoT device and the gateway is less than a second distance threshold; and
      in response to the second distance determined to be less than the second distance threshold by the gateway, transmitting authentication information of the gateway to the IoT device through the communication module and receiving authentication information of the IoT device from the IoT device through the communication module so as to connect to the IoT device.

7. The gateway according to claim 6, wherein the processor receives a hardware identifier of the user device as well as a service set identifier and a password of the access point from the user device through the communication module, and wherein the processor transmits software key of the gateway and a software key of the server to the user device through the communication module.

8. The gateway according to claim 7, wherein the processor connects to the access point via the communication module through the communication module by using the service set identifier and the password of the access point received from the user device so as to connect to the server.

9. The gateway according to claim 7, wherein the user device connects to the server by using the received software key of the server and connects to the gateway by using the received software key of the gateway.

10. The gateway according to claim 6, wherein the processor receives hardware related information of the IoT device from the IoT device through the communication module, and wherein the processor transmits a software key of the gateway to the IoT device through the communication module.

11. The gateway according to claim 10, wherein the hardware related information of the IoT device comprises a hardware identifier, a hardware key, or hardware information.

12. The gateway according to claim 6, wherein the server is a cloud server.

\* \* \* \* \*